Patented Jan. 29, 1935

1,989,493

UNITED STATES PATENT OFFICE 1,989,493

VAT DYESTUFF OF THE 1.2-BENZANTHRAQUINONE SERIES

Heinrich Neresheimer, Ludwigshafen-on-the-Rhine, Willy Eichholz, Mannheim, and Georg Boehner, Edingen-on-the-Neckar, Germany, assignors to General Aniline Works, Inc., New York, N. Y., a corporation of Delaware No Drawing. Application October 11, 1932, Serial No. 637,352. In Germany October 19, 1931

9 Claims. (Cl. 260—61)

The present invention relates to the production of vat dyestuffs of the 1.2-benzanthraquinone series.

We have found that vat dyestuffs which probably belong to the dibenzoyleneanthanthrene series the fundamental substance of which has the formula:—

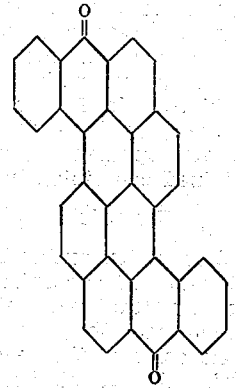

can be produced by treating Bzl,Bzl'-di-1,2-benzanthraquinonyls containing hydrogen atoms in the Bz4-positions with reducing agents and acid condensing agents.

As acid condensing agents may be mentioned for example sulphuric acid, chlorsulphonic acid or suitable metal halides, as for example aluminium chloride. Sulphuric acid may be employed in concentrated or moderately diluted form. The reaction may be carried out in the presence of diluents. For example aluminium chloride may be used together with pyridine or trichlorbenzene. Aluminium chloride may, however, also be employed without diluents; in this case it may be employed alone or in mixture with other metal chlorides such as sodium chloride.

As suitable reducing agents may be mentioned for example copper in the presence of acids and zinc in the presence of soda. Also pyridine exerts a reducing action, for example in the presence of aluminium chloride. The initial materials may act as reducing agents themselves so that it is possible to carry out the process without the addition of a further reducing agent.

The action of the reducing agent and the acid condensing agent may be effected simultaneously or the initial materials may be first reduced into their oxygen containing reduction products (which may be of the anthrone type or which contain hydroxy groups in the positions in which the initial materials contain keto groups or into the ethers and esters obtainable from the latter type of reduction products) which are subsequently treated with the acid condensing agents. The oxygen containing reduction products may be or may be not isolated.

The initial materials may be obtained by heating Bzl-halogen-1,2-benzanthraquinones which contain a hydrogen atom in the Bz4-position with copper or mercury. If the said reduction products are treated with condensing agents, the condensation proceeds usually more smoothly than in the simultaneous action of the reducing and acid condensing agents. In such cases, for example when treating with acid condensing agents the dimethyl ether of Bzl.Bzl'-di-1.2-benzanthrahydroquinonyl, the condensation occurs already at ordinary temperature when dissolving the initial material in sulphuric acid.

The temperature at which the condensation may be carried out varies in wide limits. Usually temperatures above 300° C. are not used.

By subsequently introducing further substituents into the resulting vat dyestuffs by halogenation, nitration or oxidation, dyestuffs having in part especially valuable tinctorial properties are obtained.

In some cases substituents enter into the molecule of the dyestuff even during the preparation of the dyestuff in the presence of suitable condensing agents; as for example chlorine when employing aluminium chloride for the condensation.

The following examples will further illustrate how this invention may be carried out in practice but the invention is not restricted to these examples. The parts are by weight.

Example 1

A solution of 10 parts of Bzl,Bzl'-di-1,2-benzanthraquinonyl of the formula:

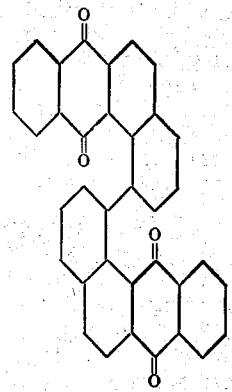

(obtainable by treating Bzl-nitro-1,2-benzanthraquinone of the formula:

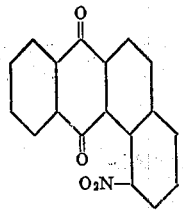

in boiling trichlorbenzene with chlorine until the cessation of the evolution of nitrous gases and heating the resulting Bzl-chlor-1,2-benzanthraquinone of the formula:

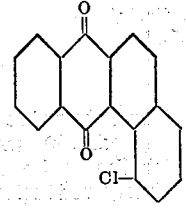

with copper powder in the presence of trichlorbenzene; crystallizing in reddish yellow needles from glacial acetic acid) in 200 parts of 96 per cent sulphuric acid is stirred at from 40° to 50° C. while adding 3 parts of copper powder and then further stirred for a short time at the said temperature. Thereby formation of the reduction product and conversion under the influence of the condensing agent occurs. The reaction liquid is poured into water and the deposited dyestuff corresponding to the formula:

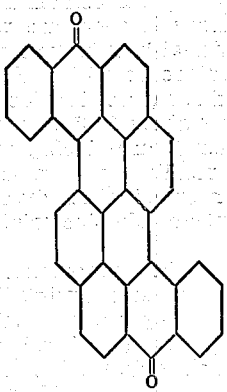

is filtered off by suction. After drying it is a violet powder. By crystallization, for example from trichlorbenzene, it is obtained in the form of violet needles. It dyes cotton powerful violet shades from a red violet vat having a red flourescence. The color of its solution in concentrated sulphuric acid is green.

The same dyestuff is obtained by dissolving in cold sulphuric acid the dimethyl ether of Bzl, Bzl' - di-1,2-benzanthrahydroquinonyl, (obtainable for example by boiling Bzl,Bzl'-di-1,2-benzanthraquinonyl for a short time with zinc dust, soda and toluene sulphonic acid methyl ester in trichlorobenzene) the solution being poured into water as soon as its color changes from brown to green.

If the initial material, Bzl,Bzl'-di-1,2-benzanthraquinonyl, be replaced by a dichlor-Bzl-Bzl'-di-1,2-benzanthraquinonyl (obtainable for example by treating Bzl-nitro-1,2-benzanthraquinone in boiling trichlorbenzene with chlorine until a dichlor-1,2-benzanthraquinone has been formed and then heating this product in trichlor- benzene with copper powder) a dyestuff is obtained which is very similar to that already described as regards its reactions but which yields substantially more bluish dyeings.

Example 2

2.6 parts of the initial material employed in Example 1 are heated at from 180° to 185° C. for about 3 hours with 24 parts of aluminium chloride and 4 parts of pyridine. The dyestuff, isolated in the usual manner, may be purified in the manner described in Example 1. It dyes cotton powerful reddish blue shades from a violet vat. The dyestuff contains chlorine.

Example 3

2.4 parts of the dyestuff obtained according to the first paragraph of Example 1 are suspended in 15 parts of nitrobenzene and then 2.7 parts of sulphuryl chloride are introduced into the suspension. The temperature of the reaction mixture is gradually raised to 90° C. and then kept constant for a short time. After cooling, the mixture is diluted with benzene, filtered by suction and the residue washed with benzene. The dry reaction product which according to analysis is a dichlordibenzoyleneanthanthrene is a dark blue powder which dissolves in concentrated sulphuric acid giving a green coloration and which separates from the said solution in the form of blue flocks when diluted with water. It dyes cotton reddish blue shades from a bluish red vat. If bromine be employed as the halogenating agent instead of sulphuryl chloride, a similar dyestuff is obtained containing bromine.

Example 4

10 parts of dibenzoyleneanthanthrene are dissolved in 200 parts of concentrated sulphuric acid, 10 parts of natural pyrolusite are stirred into the solution, and the whole is stirred at 20° C. until the color of the reaction mixture, which was originally green, becomes carmine red. The mixture is then diluted with water, the excess of pyrolusite is dissolved by means of sulphur dioxide, the residue filtered off by suction, washed with water until neutral and then dried. The dyestuff, apparently a hydroxy compound of dibenzoyleneanthanthrene, dissolves in concentrated sulphuric acid giving a green coloration which changes to carmine red when a little pyrolusite is added. It dyes cotton reddish blue shades from a dichroic blue red vat. By alkylation of the hydroxydibenzoyleneanthanthrene, as for example by means of paratoluene sulphonic acid methyl ester, a dyestuff giving more greenish dyeings is obtained.

Example 5

10 parts of dibenzoyleneanthanthrene are dissolved in 150 parts of concentrated sulphuric acid and 5.6 parts of concentrated nitric acid are introduced into the solution. The temperature is kept at 40° C. for an hour and after cooling the whole is poured into water and worked up in the usual manner. The reaction product is a dark powder which dissolves in concentrated sulphuric acid giving a turbid olive coloration. It dyes cotton grey shades from a blue red vat.

What we claim is:

1. The process of producing vat dyestuffs of the 1,2-benzanthraquinone series, which comprises treating with an acid condensing agent a compound which contains the carbon skeleton of Bzl,Bzl'-di - 1,2 - benzanthraquinonyl to which oxygen atoms are fixed at least in the 10- and 10'-positions, and which contains hydrogen atoms in the Bz4-positions.

2. The process of producing vat dyestuffs of the 1,2-benzanthraquinone series, which comprises treating a Bzl,Bzl'-di-2,2-benzanthraquinonyl containing hydrogen atoms in the Bz4-positions with an acid condensing agent.

3. The process of producing vat dyestuffs of the 1,2-benzanthraquinone series, which comprises treating a Bzl,Bzl'-di-1,2-benzanthraquinonyl containing hydrogen atoms in the Bz4-positions with a reducing agent and an acid condensing agent.

4. The process of producing vat dyestuffs of the 1,2-benzanthraquinone series, which comprises treating a Bzl,Bzl'-di-1,2-benzanthraquinonyl containing hydrogen atoms in the Bz4-positions with a reducing agent and sulphuric acid.

5. The process of producing vat dyestuffs of the 1,2-benzanthraquinone series, which comprises treating a Bzl,Bzl'-di-1,2-benzanthraquinonyl containing hydrogen atoms in the Bz4-positions with copper and sulphuric acid.

6. The process of producing vat dyestuffs of the 1,2-benzanthraquinone series, which comprises treating a Bzl,Bzl'-di-1,2-benzanthraquinonyl containing hydrogen atoms in the Bz4-positions with a reducing agent and an acid condensing agent and introducing substituents into the product thus obtained.

7. The process of producing vat dyestuffs of the 1,2-benzanthraquinone series, which comprises treating a Bzl,Bzl'-di-1,2-benzanthraquinonyl containing hydrogen atoms in the Bz4-positions with a reducing agent and an acid condensing agent and chlorinating the product thus obtained.

8. The process of producing a vat dyestuff of the 1.2-benzanthraquinone series which comprises treating a Bzl,Bzl'-di-1,2-benzanthraquinonyl with concentrated sulphuric acid and copper powder, precipitating the reaction product by diluting the reaction mixture with water, filtering off and drying the said product, suspending it in nitrobenzene and treating the suspension with sulphuryl chloride.

9. The vat dyestuff, which is substantially a dichlordibenzoyleneanthanthrene, forming a dark blue powder, capable of giving a green colored solution in concentrated sulphuric acid, precipitating from the said solution in the form of blue flocks upon the addition of water and dyeing cotton reddish blue shades from a bluish red vat.

HEINRICH NERESHEIMER.
WILLY EICHHOLZ.
GEORG BOEHNER.